United States Patent [19]

Jinnai et al.

[11] 4,364,060

[45] Dec. 14, 1982

[54] NOZZLE POSITION DEVIATION COMPENSATION ARRANGEMENT FOR INK JET PRINTING DEVICE

[75] Inventors: Koichiro Jinnai, Kawasaki; Masanori Horike, Yokohama; Kyuhachiro Iwasaki, Fujisawa; Yutaka Kodama, Tokyo, all of Japan

[73] Assignee: Ricoh Co., Ltd., Tokyo, Japan

[21] Appl. No.: 221,203

[22] Filed: Dec. 30, 1980

Related U.S. Application Data

[63] Continuation of Ser. No. 23,290, Mar. 23, 1979, abandoned.

[30] Foreign Application Priority Data

Mar. 25, 1978 [JP] Japan ................................ 53-33619

[51] Int. Cl.$^3$ ............................................ G01D 15/18

[52] U.S. Cl. ....................................... 346/75; 400/126

[58] Field of Search ............. 346/75, 140 R; 400/124, 400/126; 178/30

[56] References Cited

U.S. PATENT DOCUMENTS

| | | | |
|---|---|---|---|
| 3,890,623 | 6/1975 | Schmid | 178/30 X |
| 3,925,790 | 12/1975 | Fischbeck | 346/140 |
| 4,009,332 | 2/1977 | Hook | 346/75 X |
| 4,024,506 | 5/1977 | Spaargaren | 400/124 X |
| 4,059,183 | 11/1977 | Hoskins | 346/75 X |
| 4,084,195 | 4/1978 | Pereira | 346/75 X |

*Primary Examiner*—Joseph W. Hartary

*Attorney, Agent, or Firm*—Burgess, Ryan and Wayne

[57] ABSTRACT

In an ink jet printing device wherein when a number of n nozzles are sequentially arranged in the direction of transport of recording paper and spaced apart from each other by a distance corresponding to m characters or ink dots so that when ink dots discharged from each nozzle are arranged in one column on the recording paper in the direction of transport thereof, the adjacent ink dots have a very small spacing, but they are nearly in contact with each other, a modulo-m address counter is stepped so as to store data in a memory while a modulo-n address counter is stepped to read out data. Thus positional deviations between nozzles may be compensated.

1 Claim, 8 Drawing Figures

A B C D E F G H I J K L M N O P Q R S T U V W.....

NOZZLE POSITION DEVIATION COMPENSATION ARRANGEMENT FOR INK JET PRINTING DEVICE

This is a continuation of application Ser. No. 23,290, filed Mar. 23, 1979, now abandoned.

BACKGROUND OF THE INVENTION

The present invention relates generally to an ink jet printing device with a plurality of nozzles and more particularly a nozzle position deviation compensation device capable of simple compensation of the positional deviations of the nozzles.

In general, in the case of printing letters or symbols with a plurality of ink dots by means of an ink jet printing device with a head having a plurality of nozzles, one ink chamber and one ink pressurizing device must be provided for each nozzle, so that it is impossible to dispose the nozzles in contact with each other within a width corresponding to that of a single character. As a result, in order to attain effects equal to those obtainable with a device wherein the nozzles are in contact with each other, there has been proposed a head wherein a number of n nozzles are spaced apart in the direction of transport of recording paper by a distance corresponding to m ink dots, which is required for surrounding each nozzle and also are spaced apart perpendicular to the recording paper by a distance equal to the diameter of the nozzle. However, when a dot is recorded with ink discharged from the leading nozzle with respect to the direction of transport of recording paper and then a dot is recorded immediately beside the former dot, ink must be discharged when the next nozzle comes to the position immediately beside the first dot so that there results a time difference between the ink discharge by the first nozzle and that by the second nozzle. Furthermore the ink discharges by the third, fourth, fifth . . . nozzles are deviated in time.

In order to cause the required time deviation in ink discharge, a nozzle distance compensation device may be provided whereby the distance between the nozzles may be compensated by delaying the dot position signal, which is generated by a character generator, in response to a clock pulse from a shift register. With this device, however, the number of stages of the shift register increases with increase of the number of nozzles as indicated below.

| Number of Nozzles | Number of Stages of a Shift Register |
|---|---|
| 1 | 0 |
| 2 | 21 |
| 3 | 42 |
| 4 | 63 |
| 5 | 84 |
| 6 | 105 |
| 7 | 126 |

As a result, when constructed with general integrated circuits, the number of elements is increased with a resulting increase in cost.

SUMMARY OF THE INVENTION

Accordingly, one of the objects of the present invention is to provide a nozzle position deviation compensation arrangement for an ink jet printing device, the compensation device being simple in construction and capable of compensating for the positional deviations of the ink jet nozzles.

Another object of the present invention is to provide a nozzle position deviation compensation device for an ink jet printing device, wherein the positional deviations of the nozzles may be compensated for by the sequential reading of data which are written sequentially and spaced apart in time by a time interval corresponding to the spacing between nozzles.

The construction of the present invention which attains the above objects is such that in an ink jet recording device with a head having a number of n discharge holes spaced apart by m characters or dots, it comprises a number of $m \times n$ memory means, means for specifying an address in said memory means with a modulo-m address counter and a modulo-n address counter, means for stepping said modulo-m address counter and storing data and means for stepping said modulo-n address counter and reading data.

DESCRIPTION OF THE PREFERRED EMBODIMENTS

Figure 1:
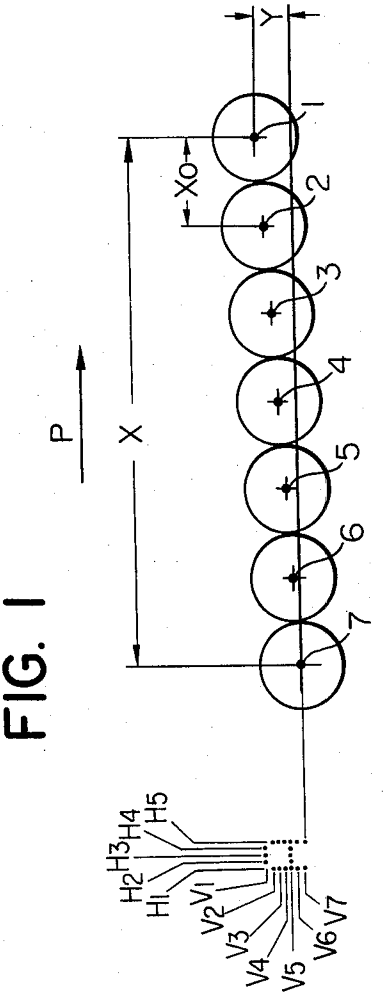
FIG. 1 is a view showing the relationship between the positions of nozzles of a print head used in the present invention and printed dots.
Figure 2:
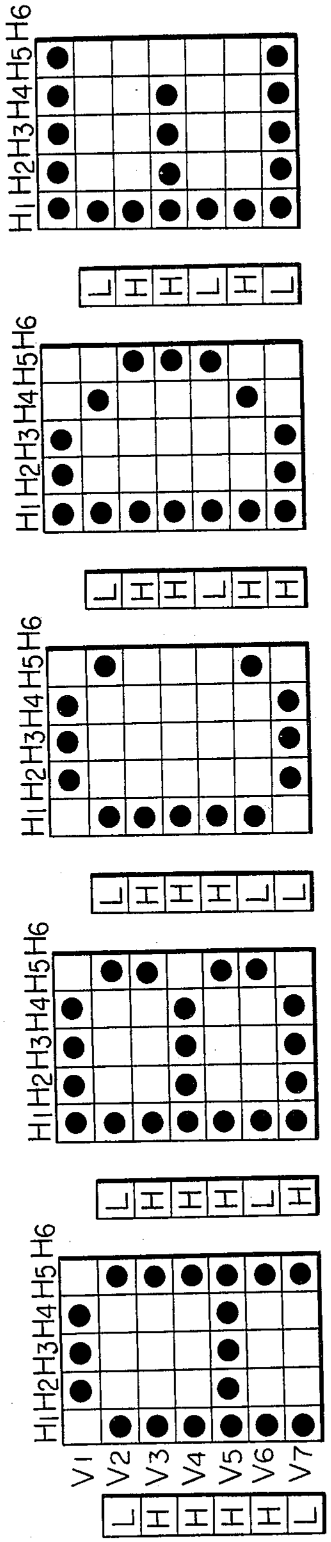
FIG. 2 is a view showing the constructions of printed letters.

In FIG. 1 is shown an array of nozzles 1–7 which are spaced apart from each other by a distance of $X_0$ in the direction P in which a recording paper is transported. As shown in FIG. 2, figures such as A, B, C, D and E are formed by an array of $5 \times 7$ dots which are specified by coordinates ($H_i$, $V_j$) where i=1, 2, 3, 4 and 5 and j=1, 2, 3, 4, 5, 6 and 7. The distance between the adjacent nozzles is equal to 21 dots so that the distance X between the first and 7th nozzles 1 and 7 is 126 dots. The vertical distance Y between the first and 7th nozzles is 6 dots.

Figure 3:
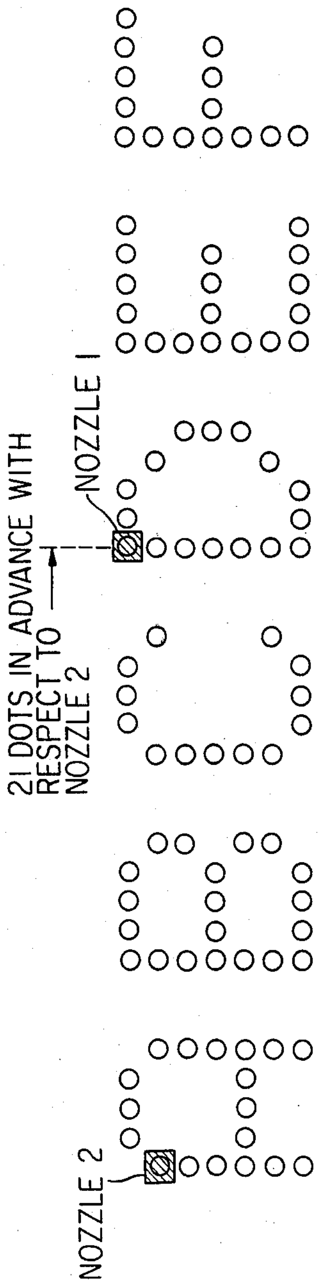
FIGS. 3 and 4 are views showing the relationship between the letters shown in FIG. 1 and the head units of the printing head shown in FIG. 2.
Figure 4:
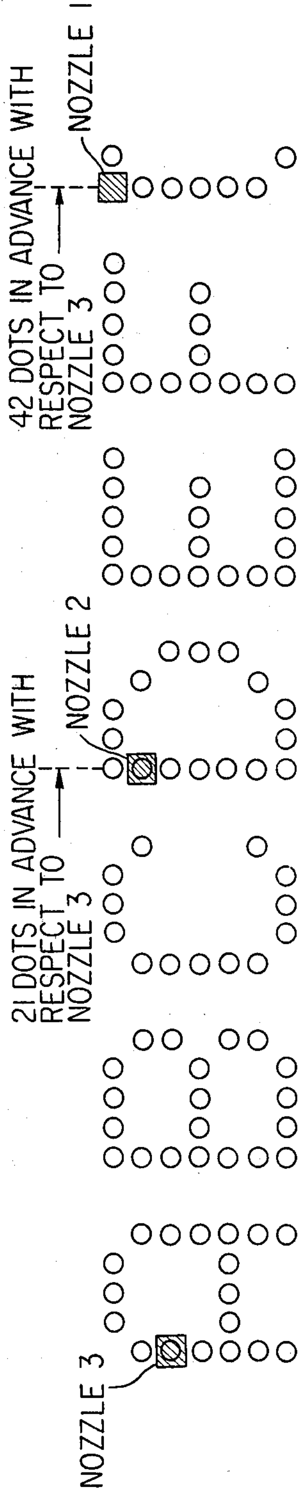

Next the recording steps will be described in connection with the dot-forming of "A". When the first nozzle 1 coincides with the $H_1$ line, a position pulse is generated, and in response to the trailing edge of this pulse, an interrupt signal is applied to a control circuit so that the first nozzle 1 forms a dot ($H_1$, $V_1$) according to a stored data. (In this instant, the dot data is "0" so that no dot-forming is effected.) When the second nozzle 2 coincides with the $H_1$ line, it forms a dot ($H_1$, $V_2$) while the first nozzle 1 coincides with the dot position ($H_1$, $V_1$) of "D" as shown in FIG. 3. When the third nozzle 3 coincides with the $H_1$ line, it forms a dot ($H_1$, $V_3$) while the first nozzle 1 coincides with the dot position ($H_1$, $V_1$) of "G" as shown in FIG. 4 and the second nozzle 2 at the position ($H_1$, $V_2$) of "D". Finally the nozzle 7 coincides with the $H_1$ line and forms a dot ($H_1$, $V_7$), which is the last step for dot-forming the letter "A". That is, the remaining dots which form the letter "A" have been formed in the other lines or columns in a manner substantially similar to that described above. In like manner, the letters B, C, D, E and so on may be dot formed.

Figures 5, 6:
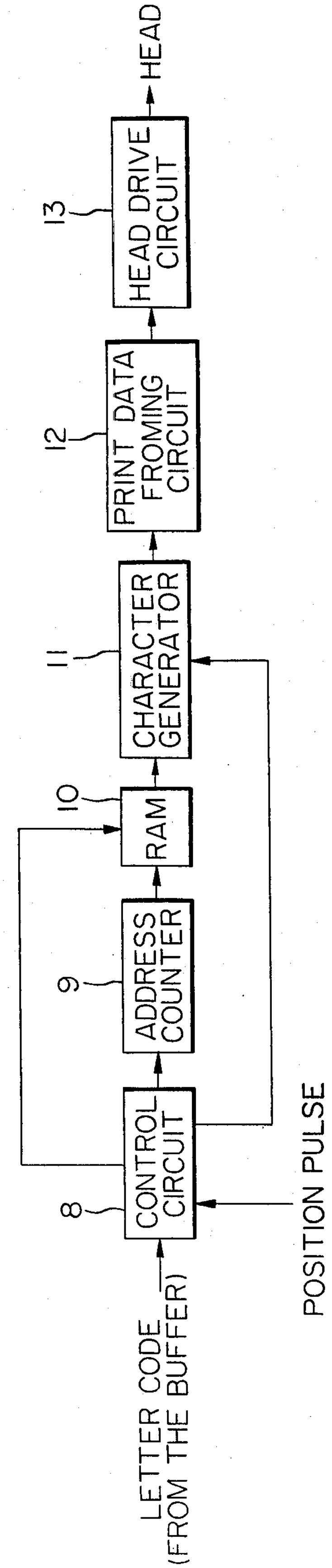
FIG. 5 is a block diagram of an electric circuit of a device in accordance with the present invention.
FIG. 6 is a view showing an example of contents in a buffer.
Figure 7:
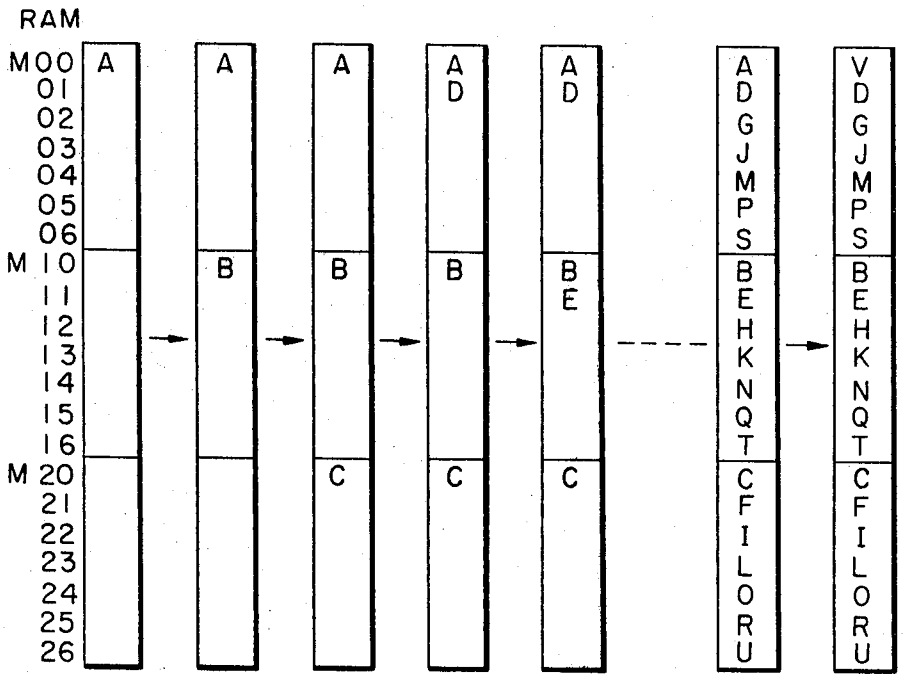
FIG. 7 is a view showing the states of storage of contents in RAM buffer used in the present invention.

In FIG. 5 is shown an embodiment of the present invention. When a printer has received the data required for printing one line, a carriage (not shown) starts advancing. When the first nozzle 1 coincides with the print-start position (for instance the position ($H_1$, $V_1$) of "A"), the control circuit 8 reads letter or symbol codes from a buffer (whose contents are shown in FIG. 6) and sequentially transfers them through an address counter 9 into a RAM 10 as shown in FIG. 7. That is, the code for "A" is stored in the storage location with an address $M_{00}$; the code for "B", in the location with an address $M_{10}$; the code for "C", in the location with an address $M_{20}$; the code for "D", in the location wih an address $M_{01}$; the code for "E", in the location with an address $M_{11}$; and so on.

Figure 8:
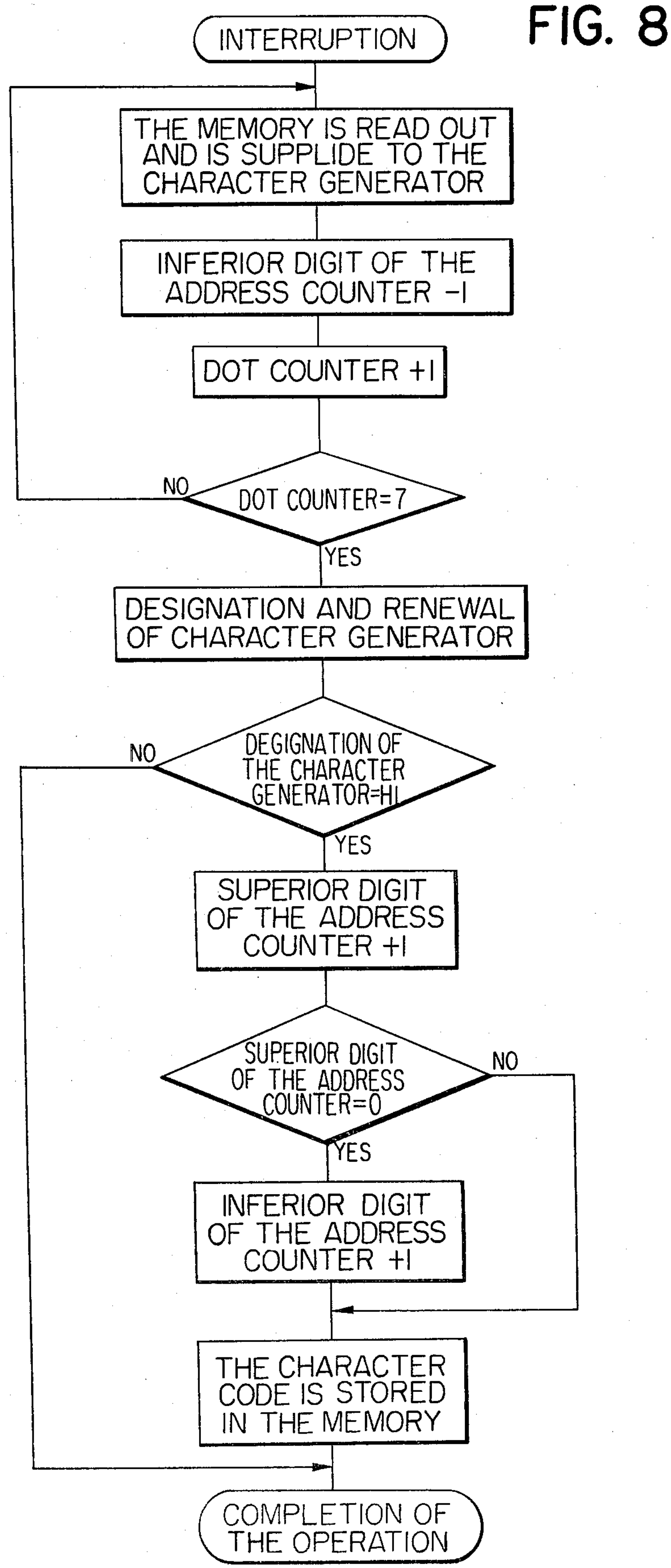
FIG. 8 is a flow chart of the present invention.

As described above, in response to the position pulse, the interrupt signal is applied to the control circuit 8 which controls a sequence of operations shown in FIG. 8. The address counter 9 is a counter with a total of five bits consisting of two upper digit bits and three lower digit bits. The two upper digit bits are counted by a modulo-3 counter while the three lower bits by a modulo-7 counter which is provided independently of the modulo-3 counter. In response to the interrupt signal, the contents in the address $M_{00}$ is read out and supplied to a character generator 11. The control circuit gives the instruction $H_1$ to the character generator 11 so that the dot code (0 1 1 1 1 1 1) of the letter "A" is derived and transferred to a print data forming circuit 12 which stores the data "0" for the position ($H_1$, $V_1$). Since the lower digit counter is a modulo-7 counter, the contents becomes "6", and the contents at the address $M_{06}$ in RAM is read out. In like manner, the contents in $M_{05}$–$M_{01}$ are read out and the data for the respective nozzles of a head are stored by the print data forming circuit 12. The stored contents (0 0 0 0 0 0 0) are transferred to a head drive circuit 13 which controls the head so as to cause the discharge of ink jets through nozzles. (In this instant, because of no data available, no ink jet is discharged.) Next the control circuit specifies $H_2$. In response to the next position pulse, the interrupt signal is applied to the control circuit so that the data for the $H_2$ line are read out in a manner substantially similar to that described above. In response to the data (1 0 0 0 0 0 0), the head nozzles are driven so that a dot is formed at the position ($H_2$, $V_1$). In like manner, dots are formed at the positions ($H_3$, $V_1$) ($H_4$, $V_1$) and ($H_5$, $V_1$), whereby the printing of ($V_1$) of one letter is accomplished. In the case of dot-forming "A", the data for $H_5$ is (0 1 1 1 1 1 1) so that the first nozzle 1 of the head of course does not form a dot. When the printing of one letter has been accomplished, the upper digit in the address counter is incremented by +1, and the letter code for "B" read out from the buffer is transferred into the storage location $M_{10}$. In response to the position pulses, the contents in the storage locations $M_{10}$ $M_{16}$–$M_{11}$ are read out, and the outputs corresponding to the print data are applied to the head so that the printing of one letter is accomplished. Next, in like manner, the code for "C" is stored in the storage location $M_{20}$ and printed. After the printing of $M_{20}$, $M_{26}$, . . . $M_{21}$, the upper digit of the address counter 9 is incremented by +1. Since it is the modulo-3 counter, it reverses to zero. Next the lower digit of the address counter is incremented by +1 so that the contents becomes "$M_{01}$". The contents in the buffer is read out and the code for "D" is stored in $M_{10}$. In response to the next position pulse, the dots of ($V_1$) of "D" and dots in ($V_2$) of "A" are formed. In this case, "D" and "A" are spaced apart from each other by a distance equal to three letters or symbols (including the space between the adjacent letters) so that the second nozzle 2 of the head forms dots of ($V_2$) below their corresponding dots of ($H_1$) formed by the first nozzle 1 of the head. In like manner, in response to the position pulse after the data for "S" has been stored in $M_{06}$, the 7th nozzle 7 of the head prints ($V_7$), whereby all the dots of ($H_1$) of "A" are formed or printed. At this time point, the first nozzle 1 has of course formed or printed the dots of ($V_2$) of "P", of ($V_3$) of "M", of ($V_4$) of "J", of ($V_5$) of "G" and ($V_6$) of "D".

When the contents in the buffer are read out and stored in RAM, it becomes possible to compensate the space between dots and to print each letter or symbol.

The dot formation is 5×7 bits, and two bits are vacant.

Therefore the character generator outputs the information representative of a letter at $H_1$–$H_5$, but gives no output at $H_6$ and $H_7$, which become zero level.

When the character generator specifies $H_6$ and when the interrupt signal is applied, the operations are similar to those of $H_1$–$H_5$, but no letter or symbol information is derived from the character generator so that the head will not print. And $H_6$ is stepped to $H_7$. In like manner, when $H_7$ changes to $H_1$, in response to the discrimination of the character generator's designation=$H_1$, it flows to Yes. Therefore the printing of one letter has been accomplished, and in response to the next position pulse the printing of the next letter is started. Therefore, it is required to transfer the next letter into a memory when the printing of one letter is completed.

To this end, the upper digit of the address counter is incremented by +1 and $M_{10}$ is designated (in the case of the immediate precedent being $M_{00}$). Next it is checked whether the upper digit of the address counter is "0" or not. In this case, it is "1", it passes to No and the code (B) is stored in $M_{10}$.

In like manner, C is stored in $M_{20}$ and printed. When the decision of the character generator's designation=$H_1$ after printing, the upper digit of the address counter is made +1. The upper digit of the address counter is the modulo-three counter so that (2+1)→0. The decision of the upper digit of the address counter=0 results in Yes so that the lower digit of the address counter is made +1 and changed to 0-1. As a result "D" is stored in $M_{01}$. The printing is continued by cycling the above steps.

As described above, the present invention uses RAM so that in the case of process with a microprocessor or the like, no external shift register or the like is required. Furthermore an address counter incorporated in a microprocessor may be used so that it is advantageous from the standpoint of production cost. In addition, the number of component parts can be drastically reduced so that high reliability may be attained.

So far the memory for storing the letter codes has been described as being 5×7 (m×n), but it is to be understood that the dot space compensation may be also attained with a memory for storing the dot data in 21×7 construction. In this case, the dot is a standard so that the distance between the head units becomes 21 while it is three in the case of the letter codes. As a result, modulo-21 and modulo-7 address counters are required.

In the above embodiment, the modulo-three counter is used as the upper digit of the address while the modulo-7 counter, as the lower digit, but it is understood that they may be reversed. Furthermore, the modulo-3 and modulo-7 counters may be replaced with modulo-4 and modulo-8 counters, and upon completion of flow, the step of the address may be increased by one time.

What is claimed is:

1. A digital nozzle position deviation compensation system for an ink jet printing device having n nozzles for producing character-forming ink dots, said nozzles being vertically staggered with respect to each other and horizontally positioned with respect to each other in the printing direction, the horizontal distance between adjacent nozzles corresponding to m characters or character-forming ink dots said compensation system comprising:

a character code buffer for providing a series of character code signals representing characters to be printed;

a random access memory having m×n memory elements for storing respective ones of said character code signals;

an address counter including a modulo-m counter circuit and a modulo-n counter circuit, the combined outputs of said circuits constituting an address code for specifying the location in said memory at which a corresponding character code signal is to be stored;

a character generator for providing data respecting the ink-dot pattern of each character to be printed, in response to a corresponding code signal from said memory and a designation signal specifying the particular dot column of said character to be printed;

a control circuit for (i) coupling said character code signals from said buffer to said memory seriatim, (ii) stepping said address counter in synchronism with the relative movement between said nozzles and a recording medium in said printing direction to cause successive character code signals to be stored in said memory at addresses differing from the addresses of the immediately preceding character code signals by n units, (iii) causing said character code signals to be sequentially read from said memory and coupled to said character generator in the order of the addresses of the elements of said memory, and (iv) providing said designation signal to said character generator in synchronism with the stepping of said address counter, so that character code signals are stored in said memory at address intervals of n units and are read from said memory at sequential address intervals; and print control means responsive to said data from said character generator for causing said nozzles to sequentially print ink dots on said recording medium in accordance, whereby the effect of horizontal offset of said nozzles is compensated, so that said nozzles may produce groups of ink dots on said recording medium corresponding to said characters.

* * * * *